US006538258B1

(12) United States Patent
Rau et al.

(10) Patent No.: US 6,538,258 B1
(45) Date of Patent: Mar. 25, 2003

(54) APPARATUS FOR CURING FLOOR COATING

(75) Inventors: Michael A. Rau, Eden Prairie, MN (US); Kenneth A. Kaczmarz, La Grange, IL (US); Ronald A. Shelk, Naperville, IL (US); James V. Allen, Lombard, IL (US); Jerome E. Rau, Hoffman Estates, IL (US)

(73) Assignee: Minuteman International, Inc., Addison, IL (US)

( * ) Notice: Subject to any disclaimer, the term of this patent is extended or adjusted under 35 U.S.C. 154(b) by 0 days.

(21) Appl. No.: 09/398,331

(22) Filed: Sep. 17, 1999

Related U.S. Application Data

(60) Provisional application No. 60/101,278, filed on Sep. 22, 1998.

(51) Int. Cl.[7] .................................................. B01J 19/08

(52) U.S. Cl. .................................... 250/504 R; 250/504

(58) Field of Search ............................. 250/504, 504 R, 250/492.1; 427/44, 487; 118/641

(56) References Cited

U.S. PATENT DOCUMENTS

| | | | | | |
|---|---|---|---|---|---|
| 4,025,795 | A | * | 5/1977 | Lackore et al. ......... | 250/504 R |
| 4,241,255 | A | * | 12/1980 | Sugiyama et al. | |
| 4,999,216 | A | | 3/1991 | Gaske et al. .................. | 427/54 |
| 6,096,383 | A | * | 8/2000 | Berg et al. | |
| 6,207,118 | B1 | * | 3/2001 | Gaven et al. | |
| 6,245,392 | B1 | * | 6/2001 | Hillenbrand | |

* cited by examiner

*Primary Examiner*—John R. Lee
*Assistant Examiner*—Anthony Quash
(74) *Attorney, Agent, or Firm*—James J. Hill

(57) ABSTRACT

A microprocessor-controlled mobile machine for curing a floor coating includes a source of radiant energy in the form of ultraviolet (UV) light which is mounted to the machine. The machine may be operated in a Traverse mode under operator control of speed for moving to an application site. A Standby mode permits the UV applicator to operate at a quiescent state to reduce warm-up time while permitting the machine to be maneuvered by the operator. A Cure mode (of which there may be a plurality) operates the machine at predetermined, processor-controlled speed and the UV applicator at a predetermined power level.

21 Claims, 9 Drawing Sheets

APPARATUS FOR CURING FLOOR COATING

RELATED APPLICATION

This application claims priority benefit under 35 U.S.C. Section 120 of abandoned provisional application No. 60/101,278 filed Sep. 22, 1998.

FIELD OF THE INVENTION

The present invention relates to a floor care machine, and more particularly, to a mobile, powered machine for curing a floor coating using ultraviolet ("UV") light. The machine of the illustrated embodiment contemplates that a liquid floor coating be applied manually, but the invention relates, as well, to apparatus which both applies the liquid floor coating and cures it in situ.

BACKGROUND OF THE INVENTION

U.S. Pat. No. 4,241,255 for ULTRAVIOLET RAY PROJECTOR discloses a machine for irradiating an applied floor coating with ultraviolet light to cure, and harden, the coating. This patented apparatus is particularly directed to manually manipulating the source of UV light to apply UV light to the coating in locations difficult to access, such as corners; and it discloses a manually-actuated shutter mechanism for controlling the application of the UV light to the coating being cured.

U.S. Pat. No. 4,999,216 for METHOD OF COATING CONCRETE FLOORS WITH PHOTOCURABLE COATINGS discloses a method of coating a concrete floor with a coating composition in liquid form and allowing the liquid to seep into the concrete surface to form a smooth coating, then exposing the coating to light in the ultraviolet and near visible range to cure the coating. Apparatus for carrying the source of ultraviolet light is disclosed only in schematic form.

As used herein, the terms "floor coating" or "coating" or "curable floor coating" and equivalents are intended to be broadly interpreted and refer to floor coatings applied in the liquid state and capable of curing to a solid state upon being irradiated by light. The light in the illustrated embodiment which effects curing is primarily in the ultraviolet region, but may include light in the near visible. However, the instant invention is not dependent on any particular coating materials. The invention relates to all materials which cure upon application of radiant energy (i.e., "photocurable" materials), whether it is in the ultraviolet region primarily, or includes both ultraviolet, near visible and visible light, as persons skilled in the art of photocurable materials will understand. Such coatings are known, for example, as described in U.S. Pat. No. 4,999,216, and in copending U.S. provisional patent application for Ultra Violet Light Curable Floor Coating With Coloring Agent, filed Sep. 29, 1998 and bearing Serial No. 60/102,220. The radiant energy catalyzes a free radical polymerization and results in a fully cured coating in a matter of seconds, depending on the level of intensity of the radiated energy. An example of a curable floor coating requiring primarily ultraviolet light, has, as the two active elements, a urethane acrylate oligomer and an acrylated monomer blend. Curable coatings of this nature are commercially available and known in the art.

Thus, whereas the light source of the illustrated embodiment is primarily a source of ultraviolet energy, it is intended that the invention and the terms ultraviolet or "UV" include light sources of radiated photo energy of any wavelength or frequency which causes curing or cross linking or which catalyzes free radical polymerization of he applied photoreceptive materials to create the desired coating. The present invention does not contemplate limitation to any particular coating or to any band of photo energy other than that the material be capable of being cured from a liquid to a solid state upon exposure to photo radiation after the coating has been applied to a floor surface.

Sources of UV light in the form of fluorescent tubes have been developed for various applications. Some of these sources include a parabolic reflector to collect light from one side of the source and redirect it, focusing the light at a focal point (actually, a line parallel to the axis of the fluorescent tube and spaced from the axis at a known distance). Sources of UV light of this type for commercial use require substantial amounts of electrical power for operation. In order to achieve efficient and economical application of the light to a floor surface, for the present invention, it is desirable that the UV light source be maintained at a predetermined distance from the surface of application to maximize and control the application of UV power. Another known problem in using flourescent lamps is that the amount of radiant light energy produced by the lamp is a function of the temperature of the lamp, and it takes a substantial amount of time (in relation to the cure rate for available material) for the lamp to heat up to operating temperature for producing a constant or substantially constant level of irradiation (or power level). Using a lamp which has not achieved desired operating temperature could produce uneven results in curing, but initiating a start cycle after each lamp shut-off would result in appreciable delays.

Materials are known for producing a photocurable coating for surfaces, including floor surfaces, but applicants are not aware of any commercial machine currently available on the market for in situ application of photo energy to a curable coating. At least one of the reasons for which it is believed no commercial systems are currently available, is the problem associated with obtaining consistent results on the floor. The photocurable materials are cured at fast rates, but the cure rate or time is highly dependent upon the intensity of the light radiated on the coating. Cure is dependent on both the time of application and the flux density (i.e., intensity) of the light incident on the coating. The light flux density, in turn, is a function of the distance of the light source from the application surface, as mentioned above, and the power applied to the light, as well as the operating temperature of the light source.

Thus, consistent results cannot be obtained on the cured material unless the lamp has reached stable operating temperature. Likewise, results are inconsistent if the power to the lamp is changed, the rate of floor traverse of the machine is changed, or the height of the lamp is changed.

When all of these variables are considered, and particularly the fast cure rates of photocurable materials, it will be appreciated that commercial manufacturers of floor care machines have been reluctant to address the problems. It must be further appreciated that operators of floor care machines typically involve permanent maintenance personnel or contract maintenance personnel. Both such occupations are skilled in the mechanical manipulation of machinery such as buffers, burnishers, floor scrubbers and carpet cleaners, and have little or no experience in handling fast-curing materials curable upon exposure to photocuring light.

SUMMARY OF THE INVENTION

The present invention provides a mobile, motor-driven floor care machine which uses a programmable computer such as a microprocessor or other signal processor, data processor or controller for controlling the functions associated with ultraviolet curing of a floor coating by a driven (i.e., powered) machine. The machine has three basic modes of operations: Traverse (or Manual), Standby and Cure. These are sometimes referred to as the "system" or "machine" operating modes to distinguish them from the operating modes of the ballast which are independent operating modes. Briefly, in the Traverse (or "Manual") mode, the floor (or "traverse") speed of the machine is under operator control. The Standby mode keeps the UV applicator powered at a level called a quiescent or steady state level, to greatly reduce the time to reach a Cure level. The traverse speed of the machine is also controlled by the operator in the Standby mode. In the Cure modes, the illustrated embodiment has three separate cure settings (Cure I, Cure II and Cure III), but the invention is not limited to the number of settings in a Cure mode of operation. For each Cure mode, the machine is driven at a predetermined speed, set by the microprocessor, and correlated with the power level of the UV lamp to achieve uniform dosage per unit area, and promote uniform cure results.

The illustrated machine is driven by an electric motor and includes driven rear wheels and a forward caster wheel for steering and mobility. A source of ultraviolet (UV) light or other source of curing radiant energy is mounted at the front of the machine near the floor. The UV light source is mounted in an enclosed housing provided with a shutter, and the housing is carried by a control or positioning linkage so that the light source may be raised for the Traverse mode, and lowered for the Standby and Cure modes. In the Cure modes when the machine is in motion, the shutter is open and the height of the UV light source is controlled by the processor to be within a predetermined height range above the floor.

In the Traverse mode, which is used to move the machine under power from one application site to another under operator speed control, the microprocessor: (i) turns off the ballast energizing the UV light source, (ii) closes the shutter of the UV applicator, and (iii) raises the housing for the UV light source to a transport position. In the Traverse mode, operation is manual, under the control of the operator, and a conventional motor drive system employing Pulse Width Modulation circuitry is used to energize a DC motor to power the machine. Speed may be varied by the operator, and the operator also has control over forward/reverse direction, using hand-actuated levers (or "direction actuators").

In the machine Standby mode, when selected by the operator, the UV lamp is energized to a quiescent state. This means that the UV applicator is at a level of electrical power lower than for curing operation but sufficient to reduce the time necessary to heat the lamp for Cure mode operation. In the quiescent state of the Standby mode, the UV lamp housing is lowered to the use or Cure position, and the shutter remains closed, but a cooling fan is turned on to cool the housing.

In each of the three Cure modes, a particular cure level is selected by the operator. The functioning of the machine is substantially the same for each Cure mode except that the traverse or floor speed of the machine for each Cure mode is predetermined and controlled by the processor, as a function of the cure rate selected by the operator. By way of example, Cure mode I may be of the highest power level or intensity of applied radiant energy, and thus be the fastest traverse speed. Cure mode II may have a medium intensity of applied radiant energy and a corresponding lower traverse speed. And Cure mode III is the lowest power level, and a correspondingly lower traverse speed. The total dosage of applied radiant curing light is substantially constant for each Cure mode, but the application time is different for each Cure mode.

In short, operation of the system in the three Cure modes is the same except that the intensity level of the ultraviolet light source is different, and the microprocessor sets a different traverse speed of the machine for each light intensity. The higher the intensity of ultraviolet light, the faster the machine will traverse the floor. Thus, in each of the Cure modes, the processor controls the ballast to energize the UV lamp at the desired power level. While the UV lamp is heating (a very short time compared to a complete start up from the off condition), the processor energizes an actuator which controls a linkage for positioning the UV lamp to the desired operating height. After a short time, of the order of a few seconds, the processor opens the shutter and actuates the traverse speed control to drive the machine, either in forward or reverse motion as selected by the operator, and at a speed set by the microprocessor depending upon the Cure mode selected by the operator.

Indicator lights are located on the control panel of the machine for indicating what mode has been selected by the operator and to display the status of operation.

Other features and advantages of the present invention will be apparent to persons skilled in the art from the following detailed description of a preferred embodiment wherein identical reference numerals will refer to like parts in the various views.

DETAILED DESCRIPTION OF A PREFERRED EMBODIMENT

Figure 1:
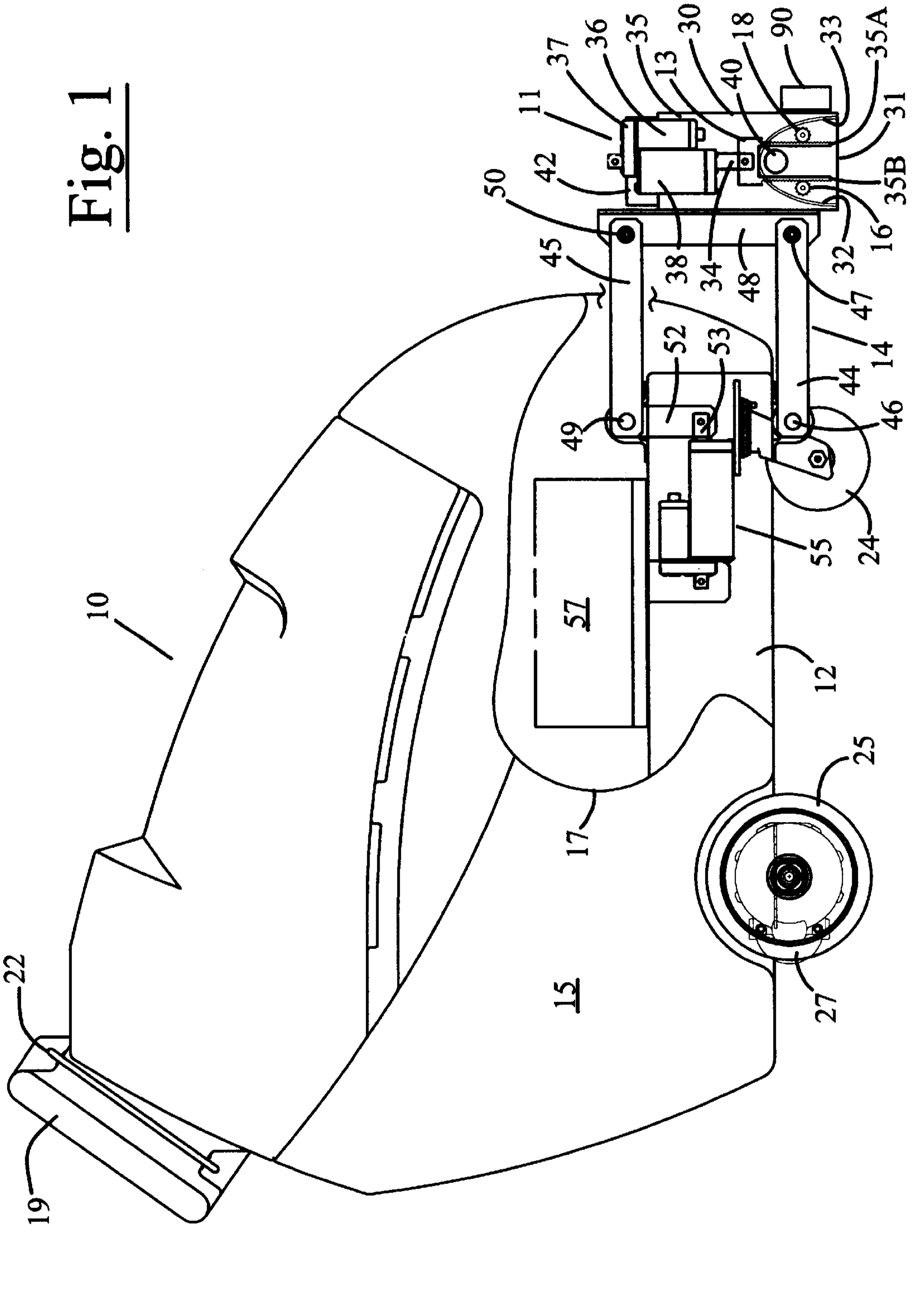
FIG. 1 is a side elevational view of a mobile machine for applying UV energy to a photocurable floor coating constructed according to the present invention.

Referring first to FIG. 1, reference numeral 10 generally designates a floor care machine equipped with an ultraviolet ("UV") applicator assembly generally designated 11. As indicated above, depending on the chemical composition of the photocurable materials applied to the floor, the applied radiant energy may include ultraviolet or visible light or both. The applicator assembly 11 is mounted to the frame or chassis 12 of the machine 10 by means of a control linkage generally designated by reference 14. The machine 10 includes a casing or housing 15 mounted to the frame 12. The casing 15 is cut away at 17 to show certain internal operative components of the machine.

Figure 4:
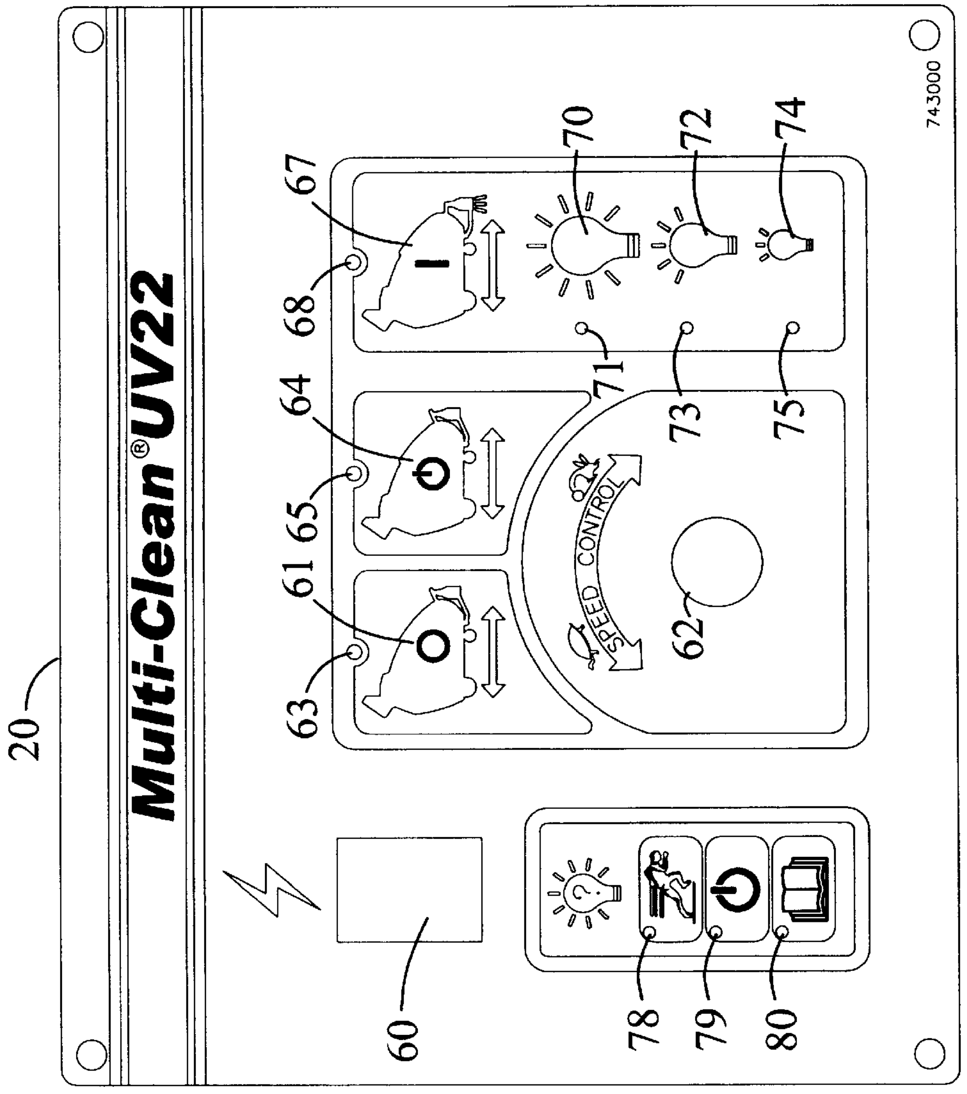
FIG. 4 is an elevational view of the operator control panel for the machine of FIG. 1.

A handle 19 is located outside the casing 15 at the operator's station; and a control panel 20, as seen in FIG. 4 is mounted, to the casing 15 at the operator's station adjacent the handle 19.

A control or "direction" actuator 22 is located adjacent the handle 19 and forward of the handle at the operator's position. A similar actuator (both in the form of a wire bale) is located on the other side of the handle 19. Actuators 22 are arranged to be grasped by the fingers of the left and right hands of the operator while the palms of the operator's hands rest on the handle 19. The direction actuators 22 are of conventional design. As will be further explained below, the operator controls the forward or reverse traverse movement of the machine by pulling the right actuator (forward) or the left actuator (reverse).

The frame 12 and machine are supported by a central front caster wheel as shown at 24 in FIG. 1 and a pair of driven rear wheels, one of which is seen and designated 25. A DC drive motor 27 drives the transaxle for the rear wheels 25 in a conventional manner and using a conventional motor control circuit employing pulse width modulation (PWM) to control speed.

Figure 2:
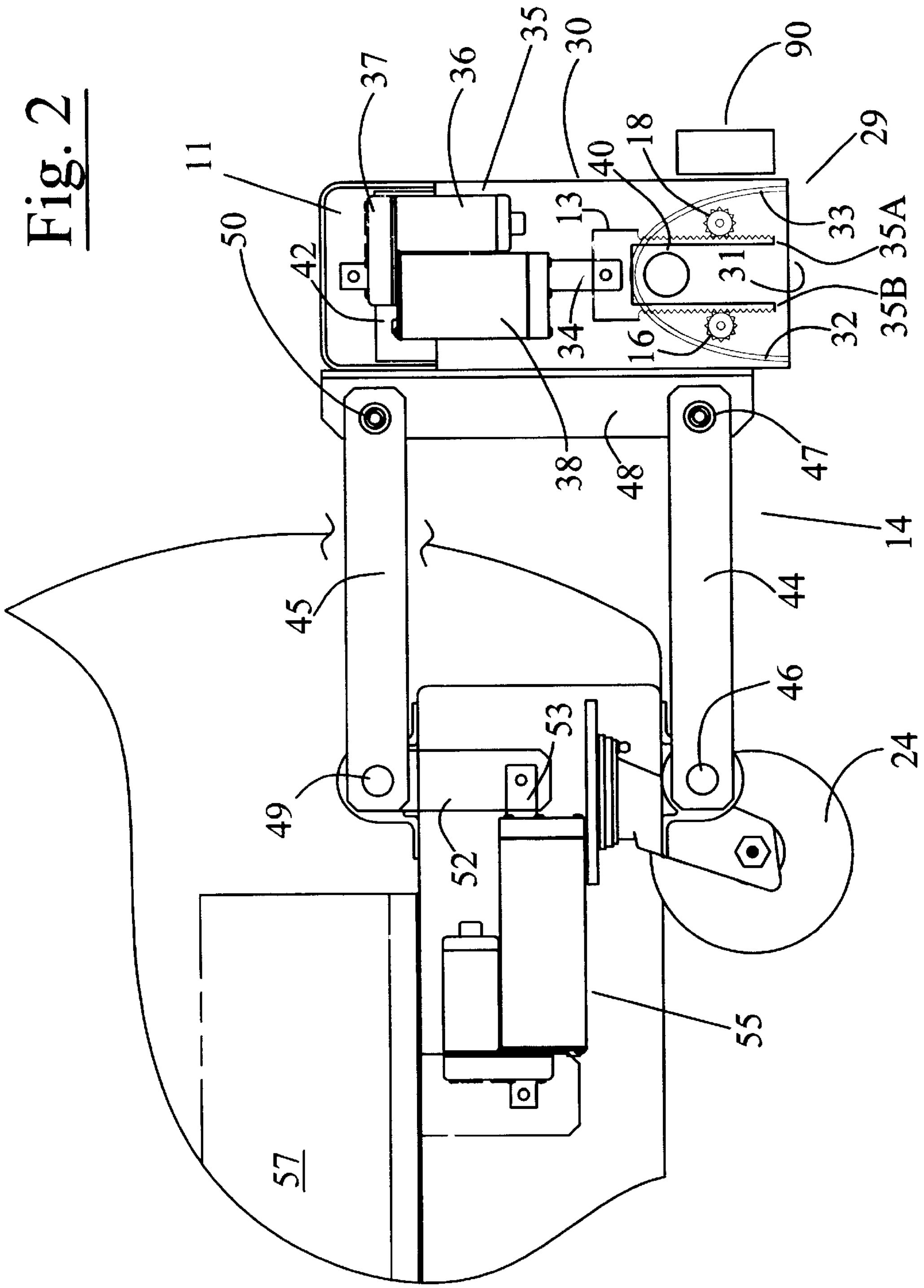
FIG. 2 is a right side close-up view of the UV applicator and shutter mechanism of the machine of FIG. 1 lowered to the use position.

Turning now to the UV applicator 11, as best seen in FIG. 2, it includes a shutter/reflector assembly 29 within an applicator housing 30 defining a downwardly-facing opening 31. A pair of curved plates 32, 33 are mounted as described below to the housing 30 to form a shutter. The shutter plates 32, 33 are mounted to pinions 16, 18, which in turn are actuated by an arm or shaft 34 of an electric linear actuator generally designated 35. Linear actuator 35 includes a DC motor 36, a gear mechanism 37 and a housing 38.

Figure 3:
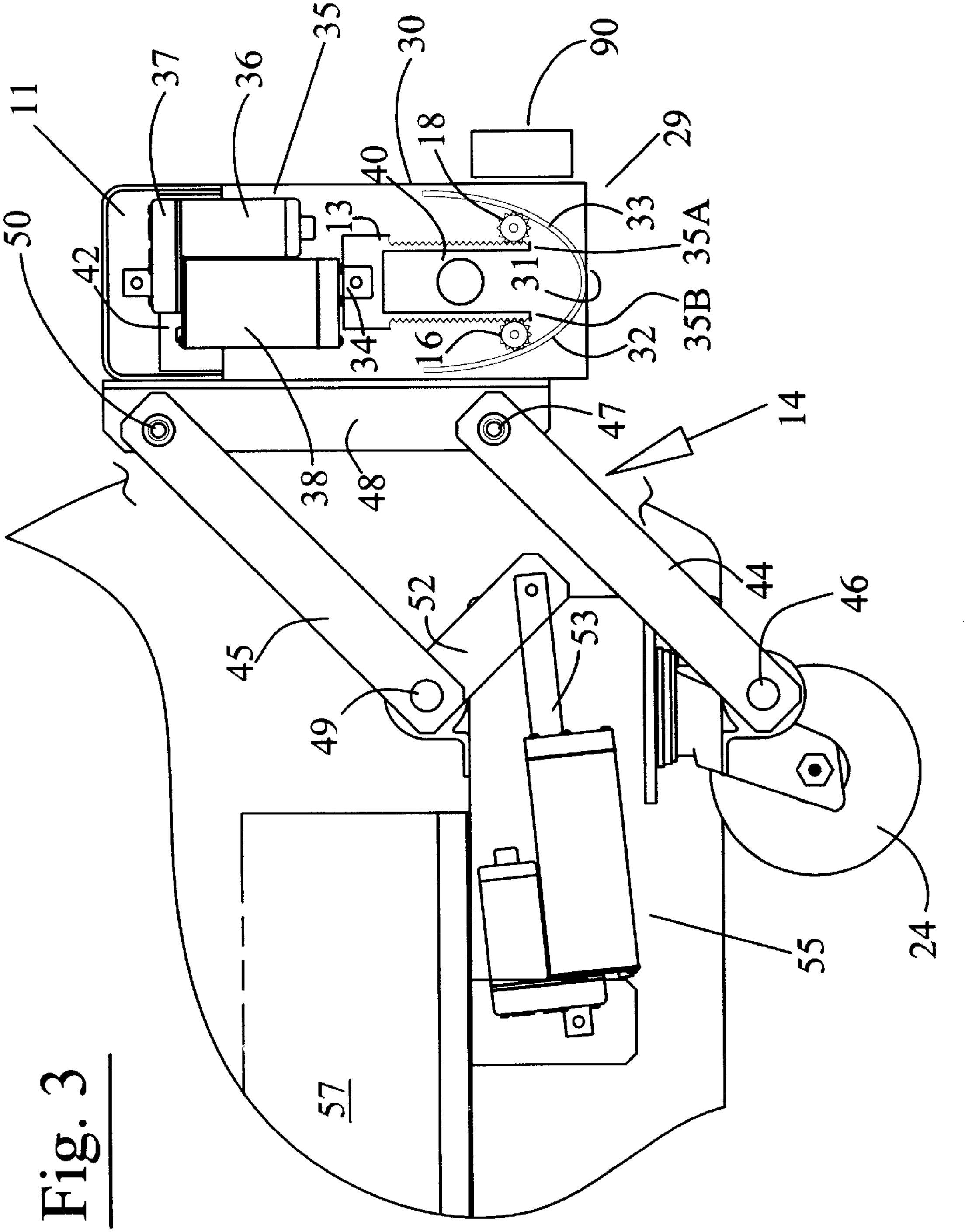
FIG. 3 is a view similar to FIG. 2 with the UV applicator raised to the transport position.

The arm 34 is connected to a bifurcated rack 13 at its distal end, forming two gear racks 35A, 35B which are coupled respectively to the pinions 16, 18 to actuate the shutter plates 32, 33 between the open or use position of FIG. 2 and the closed position of FIG. 3.

When the actuator is energized it extends or retracts (depending on the polarity of the applied voltage) the arm 34. As the arm 34 extends downwardly, it drives the rack and pinion connection to open the shutter plates 32, 33, as seen in FIG. 2, and the curved shutter plates cooperate to form a reflector and focus the light downwardly. The ultraviolet lamp 40 and the shutter reflector assembly are mounted in housing 30 to focus light from the lamp 40 downwardly onto a floor surface or other horizontal application surface when the shutter is open and the housing is in the lowered or use position seen in FIG. 2. When arm 34 is retracted, it closes the shutter plates and cuts off the UV light source from the floor below, as seen in FIG. 3.

A fan 42 is mounted to the housing 30 for forcing air through the housing to cool the lamp 40 and the entire shutter/reflector assembly 29, as will be described.

Turning now to the control linkage 14, it comprises two four-bar linkages which mount the applicator housing 30 to the frame 12 of the machine. The four-bar linkages are similar in structure and function, and they are located on either side of the center line of the machine. Turning to the right-side linkage shown in FIG. 1, it includes a lower link 44. The rear end of link 44 is pivotally mounted at 46 to the frame 12 and the forward end of link 44 is pivotally mounted at 47 to an upright bracket 48 which is mounted to the rear of, and carries, the housing 30 of the UV applicator. Upper link 45 has its rear end mounted to a rod 49 which is pivotally mounted to the frame 12, and its forward end pivotally mounted at 50 to the bracket 48. Thus, the four pivots of the control linkage are defined by the pivots 46, 47 and 50, and the rod 49.

A crank 52 is mounted to the pivot rod 49 and has its lower end pivotally mounted to an extension arm 53 of a second electric linear actuator generally designated 55 and similar to the previously described linear actuator 35. The linear actuator 55 is also under control of the processor as will be described. When arm 53 of actuator 55 is extended, it rotates the crank 52 counterclockwise about the axis of the rod 49, thereby raising the upper link 45 counterclockwise and raising the UV applicator 11 from the use position shown in FIGS. 1 and 2 to a transport position shown in FIG. 3. Also shown in FIG. 1 is a casing or enclosure 57 for the electronic ballast, which is mounted on frame 12. It is observed that raising and lowering the UV applicator 11 between the use and transport positions is different from adjusting the position of the applicator in the Cure modes to maintain the applicator within a predetermined height range during curing. The height adjustment, discussed further below, is effected by the same actuator 55 and linkage 14 under control of the computer.

Turning now to FIG. 4, there are shown the controls available to the operator. The control panel 20 may be a flexible membrane of the type used to cover control switches. That is, corresponding control switches are mounted beneath the membrane and actuated through the membrane as the operator engages and depresses an associated portion of the membrane above the switch. Reference 60 designates an actuator or pad and an associated switch to turn electrical power on or off. Electrical power is supplied in the illustrated embodiment from a conventional 120-volt, 60 Hz. source commonly found in conventional wall outlets. The following description relates to a machine powered by 120-volt, 60 Hz. power. However, the present invention is readily adaptable for voltage to 220 volts or other voltages or frequencies other than 60 Hz., or to a battery source, although the bank of batteries may have to be substantial because of the power requirements.

In order to simplify the remaining description of the control panel, each portion of the membrane actuatable by the operator will be referred to as a switch, and for simplicity the same reference numerals will refer to the switch in the schematic diagrams and the actuator portion on the control panel of FIG. 4. It will be appreciated that the actual switch is behind the membrane and may contain suitable electrical contacts for opening or closing a circuit in the schematic diagram of FIG. 5. Thus, reference 61 designates a power switch for placing the machine in the Traverse mode and de-energizing the UV applicator, if appropriate. Briefly, in the Traverse mode, the speed of the machine, as determined by the DC motor 27, previously described, is controlled by the operator's turning a speed control knob 62 which controls a potentiometer or other variable electrical device for generating a signal sensed by the processor for controlling the power to the motor, as will be described. When the operator presses switch 61, placing the machine in the Traverse mode, a visual indicator in the form of a light emitting diode or LED designated 63 is energized. The operator causes the machine to move forward by pulling the right direction actuator 22 toward handle 19, and to move in reverse by pulling the left direction actuator 22.

Typically, the operator places the machine in the Traverse mode and adjusts the traverse speed using knob 62 until the machine arrives at a location where it is desired to cure a coating. The machine is stopped when it reaches the area desired to be treated with curing light. The operator may cause the machine to enter a Standby mode by pressing switch 64 which, as will be further described, energizes a ballast circuit 84 for the UV lamp in such a manner as to place it in a state of readiness, called the quiescent state. This generates less heat than in the Cure mode, reduces the use of electricity thereby saving power, and reduces the time needed to place the machine in a Cure mode. When the machine is in the Standby mode, another LED designated 65 is energized to provide a visual signal to the operator. In the Standby mode, the machine may be driven under manual operator control and at a speed set by the operator using control knob 62. When it is desired to cure the coating applied to the floor, the operator causes the machine to enter a Cure mode by pressing switch 67, causing an indicator light 68 to be energized. The operator may skip the Standby mode and go directly to a Cure mode, if the situation warrants that action, as will be understood by persons skilled in the art from the entire disclosure of operation. Returning to the Cure modes, actuation of the switch 67 closes contacts and is sensed by the processor 82 in FIG. 5. The switch 67 may be pressed a series of four times for a complete cycling back to the initial setting. The first depression of the switch 67 causes the microprocessor to place the UV applicator in the first of three predetermined Cure modes or levels. The first depression of the switch 67 places the UV applicator in the greatest intensity of cure (called "Cure I"), visually indicated by the larger illuminated light bulb symbol 70, and provides a visual indicator to the operator by energizing an LED 71 associated with the symbol 70. The second sequential depression of the switch 67 places the system in a lesser intensity Cure mode (Cure II) associated with the visual symbol 72 and providing a visual indicator to the operator by energizing an LED 73 placed alongside the visual symbol 72. The third sequential depression of the switch 67 by the operator places the system in the Cure mode of least intensity (Cure III) represented by the smallest illuminated light bulb symbol 74, and providing a visual indicator to the operator by illuminating an LED 75. The fourth sequential depression of the switch 67 returns the UV applicator to the Cure I mode.

The number of discrete operating intensities (i.e., Cure modes) of the UV lamp, and the sequence of operating intensities may be modified by those skilled in the art without departing from the principles of the invention. In the illustrated embodiment, and by way of example without limiting the scope of the invention, the Cure I mode delivers 100% power to the UV lamp; Cure II delivers 95% of the power in the Cure I; and Cure III delivers 90% of the power in the Cure I mode. For each Cure mode, the microprocessor adjusts the speed of the motor 27, as will be discussed.

Turning now to the lower left portion of the control panel 20, there are three status indicator LEDs 78, 79 and 80. When the UV lamp is ignited initially, the ballast which ignites the lamp goes into a "Start-Up" mode. As described, the operator has the option of entering the Standby Mode or a Cure Mode. When the operator selects either the Standby mode or one of the Cure modes, the programmed microprocessor signals the electronic ballast circuit 84. The ballast enters the Start-Up mode and over-drives the UV lamp to reduce warm-up time. The ballast enters its Start-Up mode whenever it is initially turned on (i.e., Standby mode or any Cure mode) after having been completely off. Once the plasma in the lamp is stable, the ballast circuit detects this condition and enters a Run mode and sends a corresponding signal to the microprocessor. The ballast maintains the lamp in the Run mode by not permitting the power level to go below 65%, but the microprocessor determines the actual operating power to the lamp in the Cure modes by sending signals along lamp control line 98 to the ballast circuit 84. In this manner, the ballast may be held in a state of readiness (the quiescent state) but at a reduced power level. In this way, the ballast does not have to recycle through the Start-Up mode when the operator selects a Cure mode, which takes a considerably longer time than the time needed to achieve curing operation from the quiescent state. By way of example, the quiescent state may be a power level of 65% which is less than that for curing (e.g., 90–100%). The Ballast Start-Up mode is indicated by LED 79 on the control panel 20 in FIG. 4. When LED 79 is lit, the ballast is in its Start-Up mode.

After the UV lamp has reached steady operating temperature and the ballast enters the Run mode, LED 78 is lit to signal to the operator that the ballast is in the Run mode.

In summary, if the ballast is in the quiescent state of the Run mode, and either (i) the machine is in the "Standby" mode described above, or (ii) the machine is in a "Cure" mode described above, but is not in traverse motion (i.e., the operator has not actuated the forward or reverse direction actuators 22), the ballast will maintain the UV lamp operating at approximately 65% of its normal operating power for "Cure" mode I. While the UV lamp is in the quiescent state of lower power, the shutter 29 is closed to prevent illumination and curing on the surface of the floor being treated. The lower power of the quiescent state reduces thermal distortion of the shutters and housing as might otherwise occur if the UV lamp were operated at 100% capacity while the shutters are closed. As mentioned, operating in the Run mode at the quiescent level (65% of rated or design power), appreciably reduces the time required to bring the lamp to a power level desired for curing.

The ballast will not enter the Start Up mode again during the same operating cycle automatically. In other words, the Start Up mode is entered only when initially igniting the UV lamp after it had been turned off completely. If the operator exits a Cure mode and enters the Standby mode, the ballast reduces power to the lamp to the quiescent state and the shutter is closed. The ballast will remain in the Run mode at the quiescent state. When the machine is then placed in a "Cure" mode and the forward (or reverse) direction actuator 22 is operated, the processor will signal the ballast circuit to increase power to the UV lamp up to the desired operating power corresponding to the cure level selected by the operator (i.e., Cure I, Cure II or Cure III). This occurs at a comparatively short period of time relative to ballast Start-Up, and is not an inconvenience in the overall operation of the system.

When an error is detected by the ballast, an LED 80 (FIG. 4) is illuminated to alert the operator. The LED 80 is likewise associated with a visual symbol to communicate to the operator the nature of the associated status of the machine. An error may be caused by a failed UV lamp or by a UV lamp no longer capable of operating at the desired power level (as sensed by the ballast circuit 84) or by an improperly installed UV lamp, for example.

Figure 5:
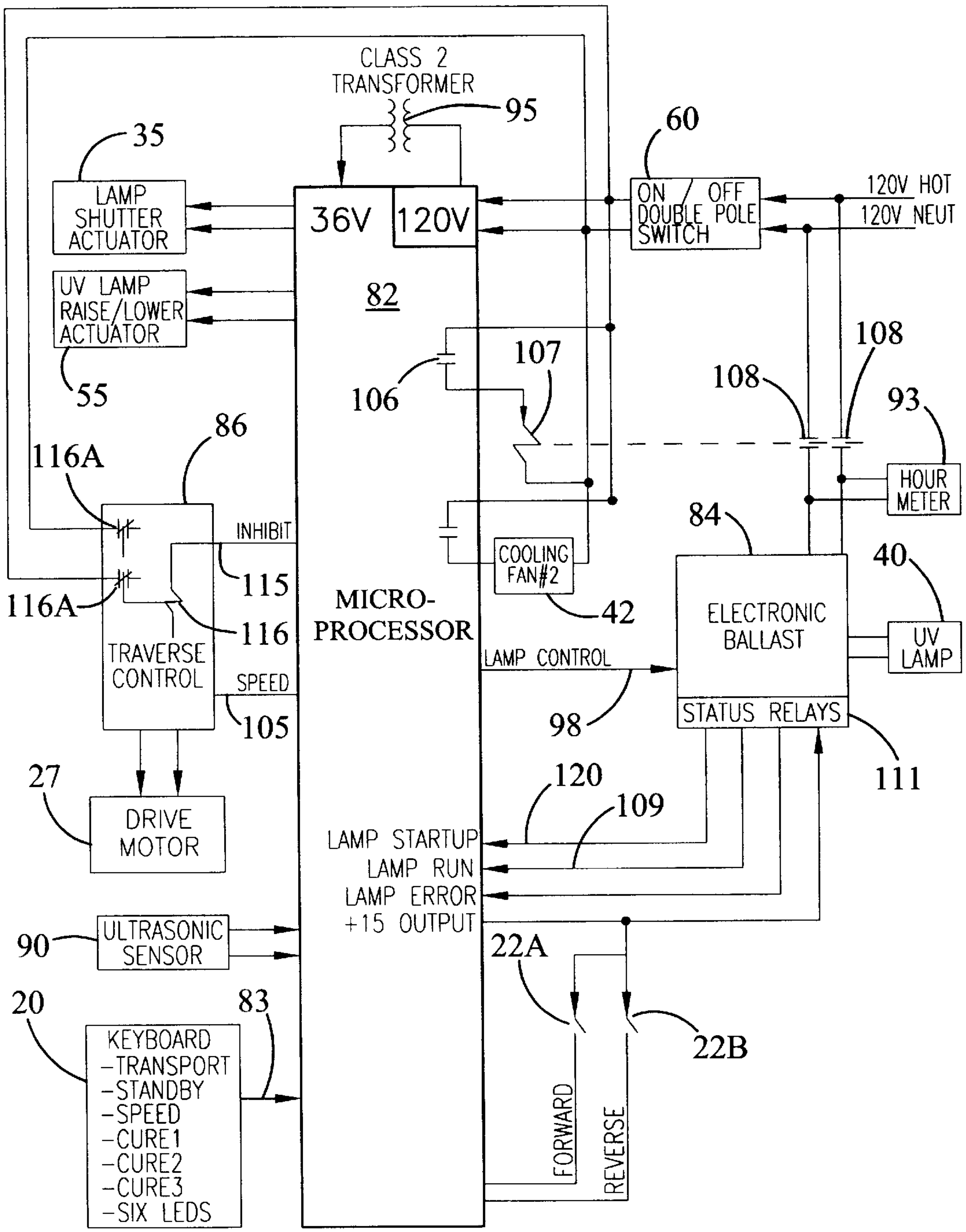
FIG. 5 is a schematic diagram for the control system for the machine of FIG. 1.

Turning now to FIG. 5, there is shown an electrical schematic diagram of the control system for the apparatus described. The control system includes a computer in the form of a programmable microprocessor (or other data or signal processor with stored program) 82, an electronic ballast circuit 84 which energizes the UV lamp 40, a conventional traverse speed control circuit 86, the previously described input keyboard or control panel 20, the previously described lamp shutter actuator 35, and the previously described linkage actuator 55 for raising, lowering and adjusting the height of the UV applicator 11. In addition, the system includes a cooling fan 42 mounted in the housing of the UV applicator 11 (FIG. 2). The system also includes an ultrasonic sensor designated 90. The ultrasonic sensor 90 is mounted on the front Of the housing 30 of UV applicator 11, and is described further below. The system may also include a meter 93 for recording the number of hours the ballast has been energized.

Microprocessor Operation

Figure 6:
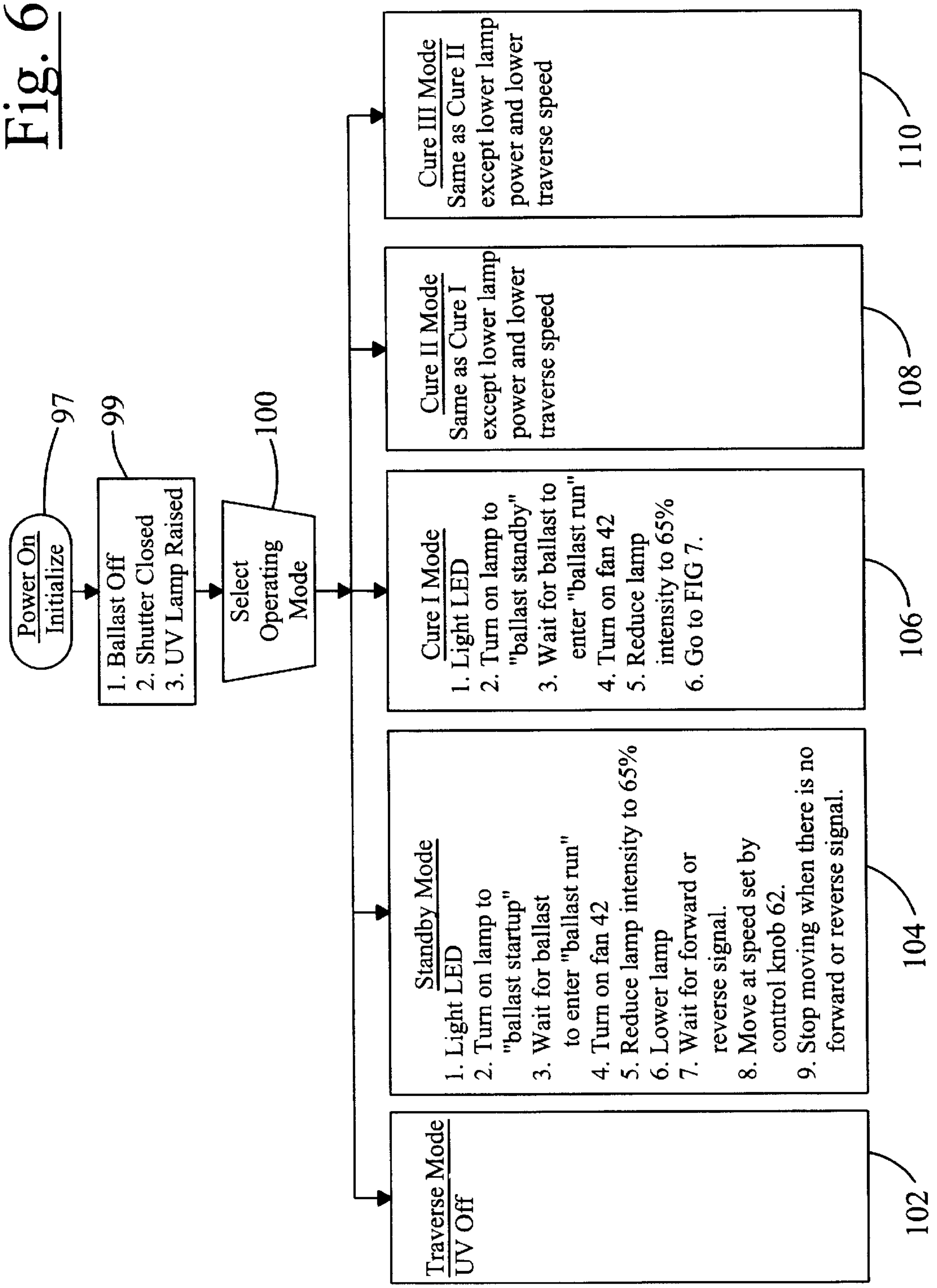
FIGS. 6 and 7 are flow charts illustrating the operation of the microprocessor and control system of the machine of FIG. 1.
Figure 7:
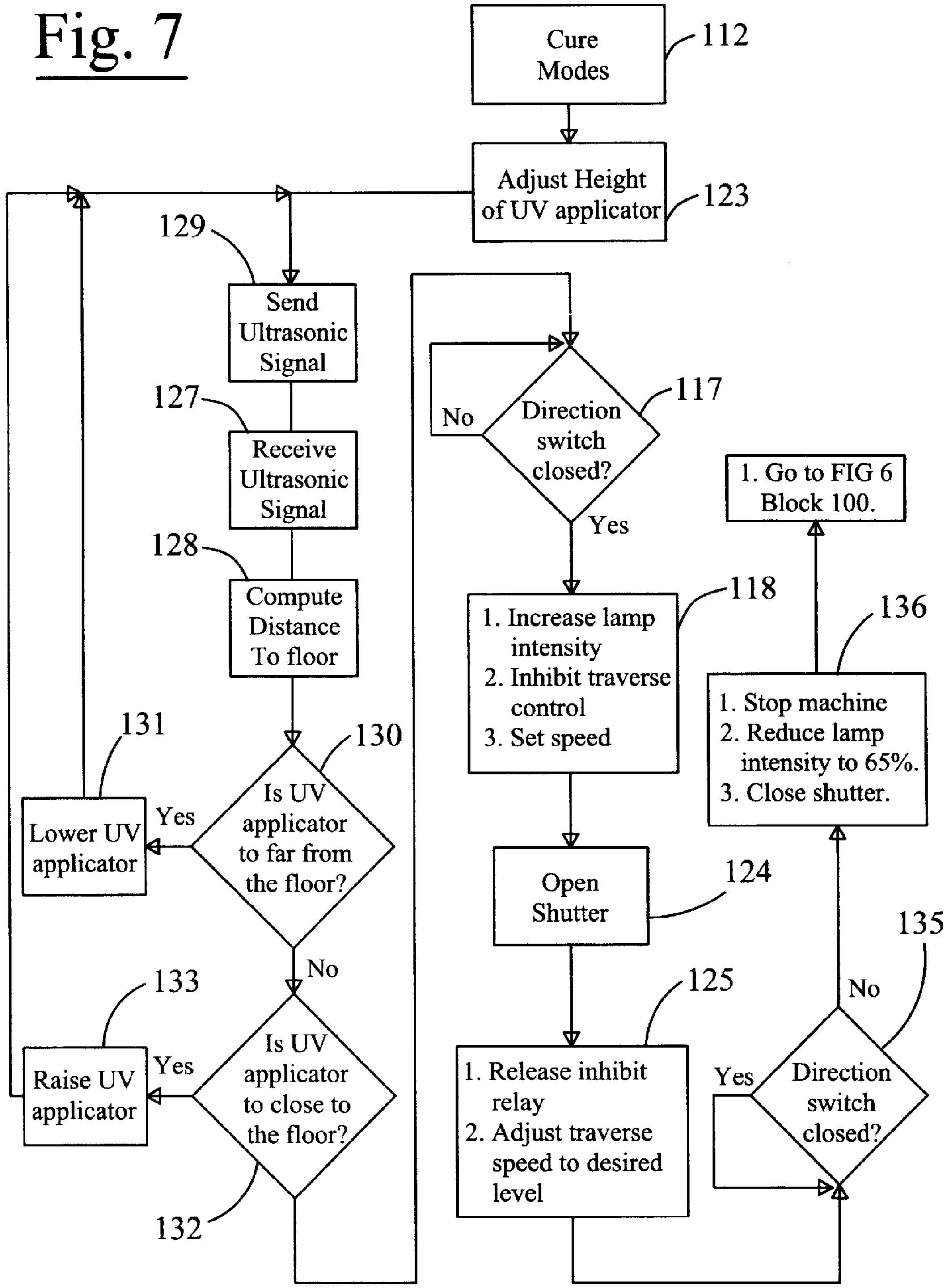

The microprocessor 82 is programmed and operates according to the flow charts shown in FIGS. 6 and 7. After the system power cord is plugged into a conventional electrical wall outlet, the operator actuates ON/OFF switch 60 on the control panel 20 and the power is fed to a transformer 95 to convert line voltage to a lower AC voltage which is then converted to DC power to energize the microprocessor 82 and other elements of the control circuit. The machine could be battery operated, as mentioned, but would have limited use time before requiring a re-charge.

When the machine is turned off, the microprocessor closes the shutter 29 via actuator 35 and raises the UV applicator 11 to the transport position by linkage actuator 55. As indicated in block 97 of FIG. 6, after power is turned on for a subsequent use, the microprocessor is initialized. In block 99, the microprocessor turns off the UV lamp 40 by opening contact 106 which prevents relay 107 from being engaged and thereby maintains contact 108, 108 open which prevents power from being supplied to the electronic ballast circuit 84. The machine is now prepared for mode selection by the operator (block 100 of FIG. 6). Normally, if the machine has been removed from storage, the operator will want to move the machine to an application site. To do so, he may place it in the Traverse mode by depressing switch 61 on control panel or keyboard 20. The microprocessor detects this signal (via bus 83 in FIG. 5) and enables the motor traverse control circuit 86 for the drive motor 27, permitting the operator to drive the machine manually either forward or in reverse, and to adjust the speed of the machine manually by the knob 62 on control panel 20.

When the operator places the system in the Traverse mode as indicated in block 102 of FIG. 6, either after power is applied and the microprocessor has been initialized or after any of the other operator-selectable modes has been used, the microprocessor detects the state of the direction actuator lever 22 (shown in electrical schematic form in FIG. 5 as normally open FORWARD and REVERSE switches 22A, 22B) and sends a signal to indicate direction to the traverse control circuit 86. The processor also sends signals to control the traverse speed of drive motor 27 in accordance with the setting of speed control knob 62 by the operator. The microprocessor senses the position of the control knob 62 and generates speed and direction signals and transmits them along line (bus) 105 to the traverse speed controller 86.

Typically, after a desired application site has been reached by the machine, the operator will press the switch 64 on the control panel, thereby taking the machine out of the Traverse mode and causing the microprocessor to enter the Standby mode as indicated by block 104 in FIG. 6. In the Standby mode, the microprocessor illuminates LED 65 on the control panel, and generates a signal to the electronic ballast circuit 84 to energize the UV lamp (by closing contacts 106 to actuate relay 107 which closes contacts 108, 108). The ballast circuit drives the UV lamp as described above until the plasma is stabilized and the lamp is ready to operate (i.e., the "Run" mode). When the Run mode is achieved, the ballast signals the microprocessor, which then reduces the lamp power and maintains the lamp in the "quiescent" state at 65% of full power to reduce the time thereafter to bring the lamp to a selected operating power. When the ballast operates in the Run mode with the machine in its Standby mode (including the quiescent state of 65% power), the microprocessor turns on fan 42 to cool the housing of the UV applicator because the shutter is closed, in order to prevent excessive heat build-up. When the ballast is in the Start-Up mode, LED 79 is lit through line 120 until the ballast enters the Run mode, at which time, LED 78 is lit through line 109.

The electronic ballast circuit 84 is a commercially available solid state ballast which includes a number of relays called Status Relays 111, which receive power from the microprocessor (15 v. output) and which signal to the microprocessor the status of the UV lamp. Thus, the UV lamp 40 is ignited, and it is permitted to warm up through a cycle in which the ballast energizes the UV lamp to operating temperature with the shutter closed to heat the lamp in a shorter time, and then the power of the UV lamp is reduced to the quiescent state and the fan is turned on.

The machine can stay in the machine Standby mode indefinitely, waiting for the operator to operate the speed control 86 by means of the hand-operated direction. actuators 22 described above for controlling machine direction and speed. In the machine Standby mode, in summary, the lamp continues to operate at approximately 65% of its normal running intensity, the shutter remains closed, and the operator may control the motion of the machine similar to the traverse mode, but the UV lamp is in a quiescent state of operativeness which reduces the warm-up time for the lamp from approximately 100 seconds to about 2 seconds.

When it is desired to place the machine in one of the Cure modes, the operator depresses the switch 67, thereby placing the machine in the Cure I mode, represented by block 106 in FIG. 6. Cure I mode is the operating mode which has the highest intensity or power level of ultraviolet light (and thus corresponds with the greatest traverse speed). The microprocessor controls the traverse speed of the machine in all Cure modes, by signalling along line 105 to motor traverse speed controller 86. If the operator desires to have the machine operate in Cure II mode, with intermediate UV intensity (e.g., 90%), the operator depresses switch 67 a second time, as explained above. If the operator desires to have the machine operate in Cure III mode, the one of least UV intensity (90%), the operator presses the switch 67 a third time. By pressing the switch a fourth time, the system is returned to the Cure I mode, as determined by the microprocessor.

All of the Cure modes have essentially the same operation sequence except that associated with each Cure mode, the UV lamp is operated at a different intensity (input power level), and there is associated with that power level, a predetermined traverse speed for the machine as programmed into the microprocessor. As disclosed below, it is not necessary that the lamp be operated at different power levels for each Cure mode, particularly if the dosage level is changed for different cure levels. There are a number of possible UV operating intensities with corresponding machine speeds (i.e., traverse speeds), but the three discrete levels of intensity/speed mentioned above have been chosen for the illustrated embodiment. Others may choose only one cure level and one speed; others may choose one cure level and a number of speeds or a combination of cure levels and speeds.

The detailed operation of each Cure mode for the illustrated embodiment is shown in FIG. 7 and will be described below. In each of the Cure modes, an appropriate one of the LEDs 71, 73 or 75 is lit to indicate to the operator which Cure mode has been selected, and the microprocessor 82 sends a signal to the electronic ballast circuit 84 (via line 98), to operate at a predetermined, programmed power level, and a predetermined, programmed traverse speed signal is sent along line 105 to the speed controller 86. The power level of the UV applicator and the Traverse speed of the machine are related to achieve a substantially constant application dosage of UV energy. This energy level is further controlled by adjusting the height of the applicator under control of the processor. The cooling fan 42 is turned on as long as the ballast is in the Run mode and the shutter is open.

The traverse control 86 is commercially available and uses conventional Pulse Width Modulation circuitry to control the speed of the drive motor 27, which is a DC motor. A suitable speed controller is available from KB Electronics of Coral Springs, FL, Model No. KBPB. In addition, an electronic lamp ballast circuit as described is available commercially from Nicolet Technologies Corporation of Minneapolis, Minn., under the model designation EBS.

Still referring to FIG. 6, each of the three Cure modes may be entered from the Standby mode or, if needed, directly from the off position or after the Traverse mode. If a Cure mode is entered from Standby mode, the UV lamp is already operating in the quiescent state of readiness and the UV applicator is lowered to the use position. If the operator enters a Cure mode from the Traverse mode, the microprocessor cycles the machine through all of the steps for Standby mode operation (e.g., ballast Start-Up), as described above, before entering a Cure mode.

When the operator pushes the Cure mode switch 67 and the UV applicator has been placed in the quiescent state (i.e., 65% of maximum power), the operator must then actuate the machine in the forward or reverse direction by means of the direction actuators 22 described above. This action generates a signal to the microprocessor from the FORWARD/REVERSE switches designated 22A, 22B in FIG. 5. The microprocessor then signals the ballast to bring the lamp intensity to desired power programmed in the computer for Cure Mode I (a corresponding percentage is set for Cure Modes II and III according to design). When each of the Cure modes is originally entered, an LED or other indicator light is lit—LED 71. (Cure Mode I) or LED 73 (Cure Mode II) or LED 75. (Cure Mode III).

The microprocessor then sets the level of lamp power according to the Cure mode selected by sending signals along lamp control bus 98 in FIG. 5, thereby bringing the UV lamp to operating temperature. When the system is operating in a Cure mode, the height of the UV applicator is monitored and controlled, as will be described, to ensure that it is positioned within a predetermined distance range above the floor.

Next, the microprocessor opens the shutter and sets the traverse speed. The speed control circuit then is operated by the microprocessor to run at the predetermined programmed speed depending upon the Cure mode selected, as will now be described. It will be observed from FIG. 5 that the traverse speed controller 86 includes an inhibit relay 116. A signal from the microprocessor on line 115 energizes the coil of the inhibit relay 116 and opens contacts 116A. This prevents power from being applied through the traverse control circuit 86 to the transaxle of motor 27 of the machine until the microprocessor removes the "inhibit" signal.

Turning now to the more detailed flow chart of FIG. 7, which shows operation of the system in the various Cure modes, the microprocessor enters a Cure mode selected by the operator in block 112. The processor first adjusts the height of the UV applicator, as indicated in block 123, and shown in more detail in blocks 127–132. The UV applicator will already have been lowered by its associated actuator to the use position, but in a Cure mode, the height of the UV applicator above the floor is adjusted so that the applicator is located within a predetermined height range before the shutter is opened and UV light is applied to the coating. Specifically, the height of the UV applicator is adjusted to be within a predetermined height range including an upper limit and a lower limit. As a practical matter, this range may be a matter of design and depends on the components selected.

Height adjustment as indicated in block 123 is accomplished in the illustrated embodiment using a conventional ultrasonic sensor mounted on the UV applicator assembly, and as indicated at 90 in FIGS. 1–3. The sensor 90 includes a transmitter which sends an ultrasonic signal toward the floor surface as indicated in block 129 under control of the microprocessor. The ultrasonic sensor also includes a receiver. which receives the reflected ultrasonic signal from the floor in block 127. The microprocessor then computes the distance to the floor in block 128 and compares the signal representative of actual distance with corresponding data stored in the microprocessor representative respectively of an upper height limit and a lower height limit.

In block 130, the microprocessor determines whether the UV applicator is too far above the floor by comparing the signal representative of the actual height computer from sensor 90 with the signal stored and representative of the upper limit of the desired operating range. If the comparison in block 130 indicates that the applicator is too high, the microprocessor lowers the UV applicator via actuator 55 and linkage 14 in block 131 and the microprocessor recycles through blocks 129, 127, 128 and 130.

This sequence continues until the microprocessor determines that the UV applicator is below the upper height limit, at which time the microprocessor proceeds in block 132 to determine whether the UV applicator is located too close to the floor—that is, beneath the lower limit of the desired operating range. If the UV applicator is determined to be too low, then the microprocessor raises the UV applicator by means of the actuator 55 and control linkage 14, and the system again recycles through the loop indicated in FIG. 7. Eventually in block 132, when it is determined that the UV applicator is within the desired operating range, the system proceeds to block 117.

In block 117, it is determined whether the operator has actuated the forward or reverse direction actuator 22, indicating that the operator intends to have the machine move in a forward direction or reverse direction. The microprocessor determines the direction of intended operation from the states of switches 22A, 22B, and communicates the direction to the traverse control circuit along with signals indicating the desired speed.

The microprocessor then increases the lamp intensity to the operating level and communicates the speed control signals, including direction and speed, to the traverse speed control circuit 86 along the speed data bus 105.

The system is then ready for operation, and the microprocessor then opens the shutter in block 124, and releases the inhibit relay 116 in block 125, thereby feeding power to the traverse control circuit 86 to energize the drive motor 27 via normally closed contacts 116A, 116A, at the speed determined by the microprocessor and in the direction selected by the operator.

Operation continues in the Cure mode selected until the operator releases the direction actuator 22 which he had been closing. That is, as long as the direction actuator remains closed or actuated (which requires the operator to squeeze it), the machine traverses the floor at the predetermined speed set by the processor. If the operator wants to stop the machine, he releases the direction actuator 22 he had been closing, and in block 135 of FIG. 7, the processor determines that the direction switch (22A, 22B) is open and, in block 136, stops the machine by actuating the inhibit relay 116, reduces the lamp intensity to the quiescent state, and closes the shutter. The operator then has the option, illustrated by block 100 in FIG. 6, of selecting any other mode, including Standby (in which case, there is no need to recycle through the ballast Start-Up, and the ballast so signals the microprocessor).

In the illustrated embodiment, the operator selects a Cure mode which selects a power level and a traverse speed because the total dosage of UV radiation is substantially constant (as the power level of the lamp increases, the traverse speed also increases). This is not always necessary. It may be desired for some applications to have each Cure mode have a different cure dosage. In such a case, the lamp power level may be constant for different Cure modes, and the traverse speed may be changed. This is accomplished easily since both power level and speed data are stored in the microprocessor. Alternatively, the microprocessor could be programmed such that the operator selects a speed, and the microprocessor determines a corresponding power level for the lamp, either for a constant applied dosage or a modified dosage. It will be appreciated that some Cure modes may have the same dosage, while others in the same machine may have modified dosages by changing either the lamp power level or the traverse speed or both.

Hand-held Applicator

In some applications there will be a desire to have a smaller, hand-held UV applicator which provides greater maneuver applicability than the larger applicator described above. However, in many instances, for example, in large grocery stores or mass merchandisers, it will desirable to have both the smaller, hand-held system and the larger, more automated system. There are two advantages of a smaller, hand-held UV applicator. The first is that it is more maneuverable to facilitate curing the photocurable material applied up to the edge of a vertical wall. The larger machine, which is driven automatically and must be steered, has greater difficulty in reaching the edge regions of a walled room due to its size and bulk. Operators will less experience may achieve more favorable results having both the larger, automated machine and the hand-held, more portable applicator.

A second advantage of the smaller, hand-held UV applicator is that it may be placed under overhangs, such as the edges of racks or shelving, found in grocery stores and large mass merchandise establishments. It is impractical for the larger machine shown in FIG. 1 to cure beneath these overhangs. On the other hand, it is deemed desirable to have the hand-held applicator capable of being plugged into the main apparatus for these minor jobs or corners or touch-ups or small areas which are difficult to access.

Figure 9:
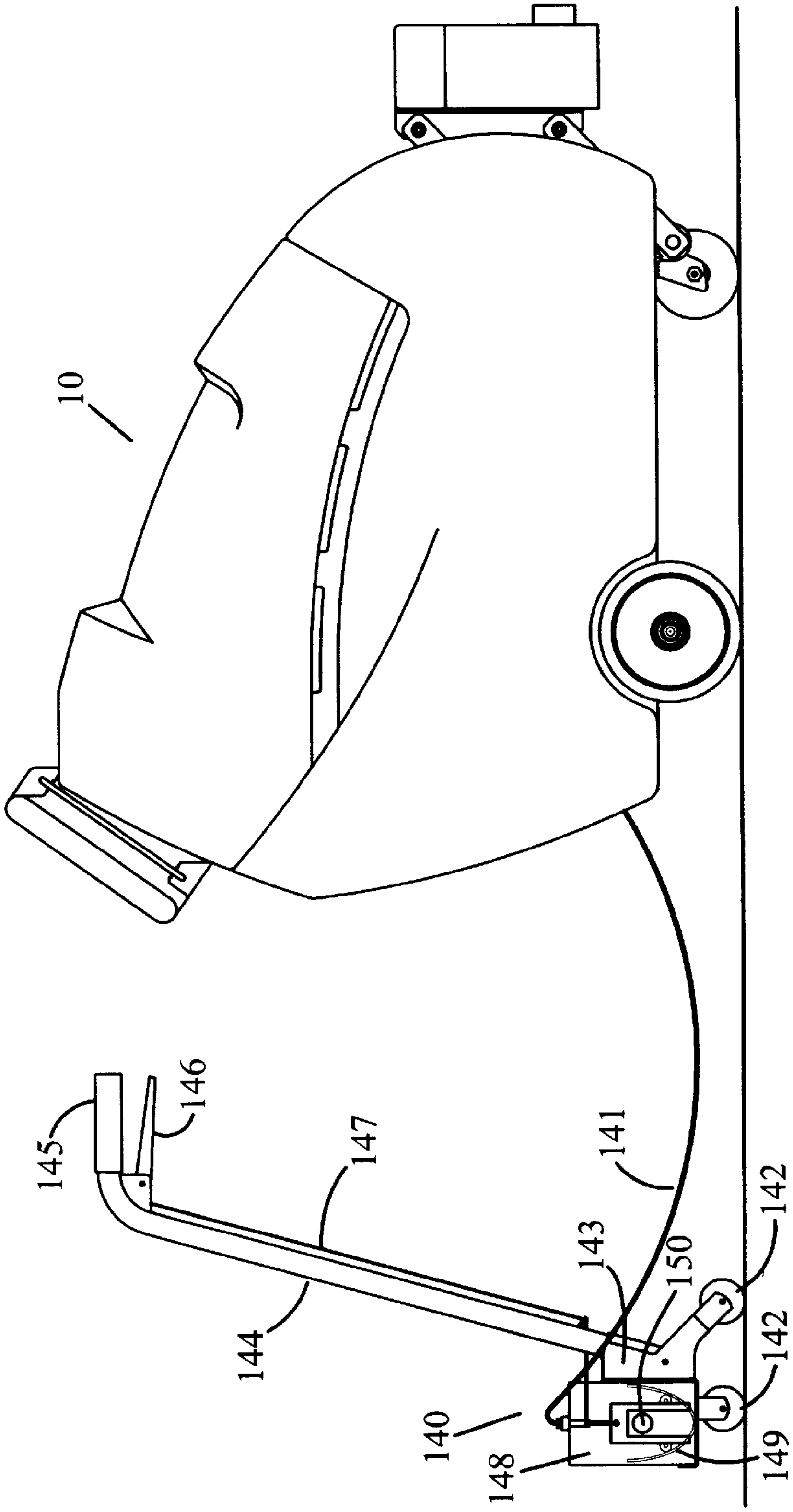
FIG. 9 is a side view showing a portable UV applicator connected to the machine of FIG. 1.

Turning then to FIG. 9, the larger machine which is self-supporting and driven automatically in the Cure modes is again designated reference numeral 10. The main machine 10 is connected to a smaller, hand-held applicator 140 by means on an electrical cord 141. The hand-held machine may include support wheels 142, although the hand-held machine could operate equally well without support wheels. Nevertheless, the hand-held applicator includes a frame 143 with a support extension 144 and a handle 145 which the operator can grasp in one hand. A trigger extension 146 connects a mechanical retraction cord 147 to a mechanism 148 for actuating the shutter 149. When the trigger 146 is actuated by the operator, the mechanism 148, which may be similar to the bifurcated rack and pinions described above, moves the two shutter plates comprising shutter 149 upwardly, so that the shutter plates form a downwardly facing reflector for the UV lamp 150.

Figure 8:
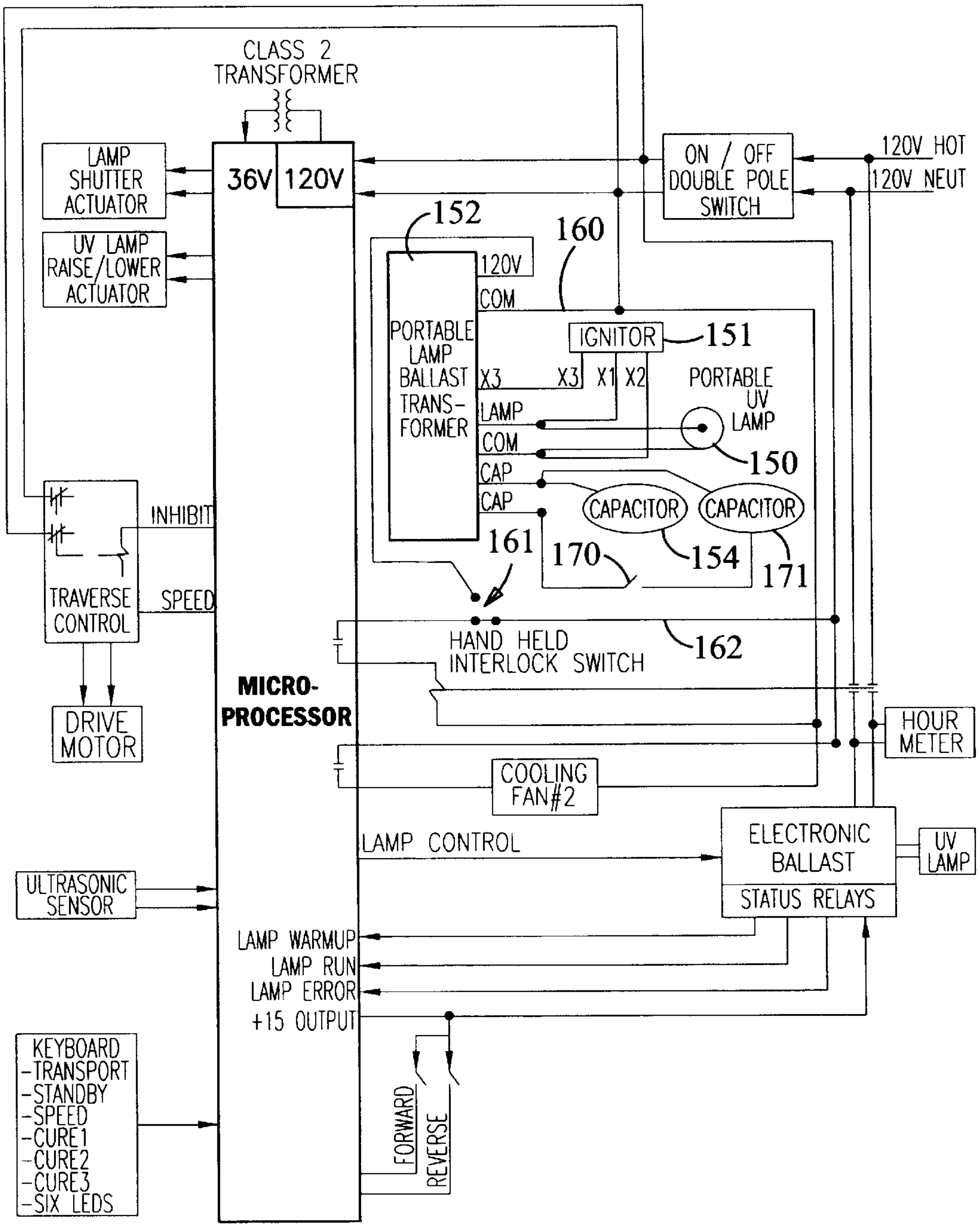
FIG. 8 is a functional block diagram of the control system of the apparatus previously described, and modified to incorporate a smaller, portable UV lamp applicator.

Turning now to the schematic diagram of FIG. 8, the smaller UV applicator lamp is shown diagrammatically and designated 150. It is excited by an ignitor 151 which, in turn, is then powered from a portable lamp ballast transformer 152, which is commercially available from Advance Transformer Company and a capacitor 154.

A primary winding of transformer 152 is connected between the system common line 160 as seen in FIG. 8 and a fixed contact of an interlock switch 161. The other fixed contact of interlock switch 161 is connected by means of a line 162 to the input power line. In illustrated embodiment, the input voltage is 120 V.

When the hand-held applicator is not being used, the interlock switch 161 is in the position shown in FIG. 8 so that the input power is coupled directly to the input of contacts 106 (FIG. 5). When the interlock switch in the hand-held unit is actuated, the movable contact interrupts the power line 162 and provides a power connection to the portable lamp transformer 152 while interrupting power to relay contacts 106, which will inhibit relay 107 and prevent contacts 108 to close, thus disabling ballast circuit 84.

This electrical connecting system and exclusive switching permits the use of maximum line power through conventional wall electrical outlets, when the larger machine 10 is in use and ensures that there is no simultaneous power drain from the hand-held unit. Simultaneous power to both units could result in repeated power interruption, particularly when the power consumption of the main machine 10 is such that it is near capacity. It is desired that the power consumption of the main machine be near capacity for normal electrical lines for maximum efficiency.

Having thus disclosed in detail a preferred embodiment of the invention, persons skilled in the art will be able to modify certain of the structure which has been illustrated and to substitute equivalent elements for those disclosed while continuing to practice the principle of the invention; and it is, therefore, intended that all such modifications and substitutions be covered as they are embraced within the spirit and scope of the appended claims.

We claim:

1. Apparatus for curing a photocurable material applied to a floor surface, comprising a frame having wheels driven by a motor; a controller controlling the speed of said motor; a source of curing light carried by said frame; a ballast circuit selectively energizing said light source; and a computer providing control signals to said ballast circuit to set the power level of said light source to a predetermined cure level; said computer sending signals to said controller to set the traverse speed of said apparatus at a rate determined in relation to the power level of said light source.

2. The apparatus of claim 1 wherein said light source generates ultraviolet curing light and said computer is programmed to control said ballast circuit to set the power level of said light source to one of a plurality of predetermined levels corresponding to a cure level selected by an operator, said computer being further programmed to control the speed of said controller to a predetermined traverse speed for said apparatus determined by the associated cure level set by said operator.

3. The apparatus of claim 2 further including a shutter at least partially enclosing said light source and having a closed position in which said shutter blocks substantially all of the light from said light source from said floor surface and an open position in which light from said light source radiates onto said floor surface, and wherein said computer sets the power level of said light source and the traverse speed of said apparatus in response to a Cure mode defining a cure dosage set by said operator, said computer being further programmed, for each Cure mode entered under operator control, to energize an associated status light mounted on said apparatus identifying the associated Cure mode to said operator, said computer thereupon energizing said ballast circuit to a Run condition, said computer being responsive to a direction actuator under control of said operator to set the power of said light source upon actuation of said direction actuator by said operator and to set the traverse speed of said apparatus, and thereupon to open said shutter and cause said apparatus to traverse the floor at said predetermined speed set by said computer.

4. The apparatus of claim 3 wherein said light source is a UV lamp and said apparatus further includes a Standby mode switch selectable by the operator, said computer being responsive to the actuation of said Standby mode switch by the operator to energize said ballast circuit to a Run mode in which said light source is operating at a power level sufficient to stabilize said light source, said ballast thereafter reducing the power supplied to said light source to a quiescent state less than operating power and sufficient to maintain said light source in a state of readiness to reduce substantially the warm-up time for said light source for curing operation.

5. The apparatus of claim 4 further comprising a speed control unit under control of said operator for setting the traverse speed of said apparatus by energizing said drive motor under operator control, thereby permitting said operator to position said apparatus for a curing application while said light source is operating at said quiescent level.

6. The apparatus of claim 1 further comprising an applicator housing for said light source and mounted to said frame for vertical motion; a second actuator for moving said applicator housing relative to the floor, said computer being programmed to lower said applicator housing to a use position when said apparatus is placed in said Standby mode by the operator.

7. The apparatus of claim 6 wherein said computer is further programmed to operate said apparatus in a Traverse mode, the computer being programmed to raise said applicator housing to a transport position when said apparatus is placed in said Traverse mode and to enable said controller to be adjusted under control of the operator.

8. The apparatus of claim 6 further comprising a direction actuator actuatable by the operator in a forward and a reverse position, said direction actuator connected in circuit with said computer to control the application of power to said motor, a shutter mounted to said applicator housing and cooperating with said housing to enclose said light source when said shutter is in a closed position, and to expose the light source to said floor surface when said shutter is open, said shutter being under control of said computer, said computer being programmed to open said shutter when said apparatus is placed in a Cure mode after the operator has actuated said direction actuator commanding said apparatus to move in a forward or reverse direction.

9. The apparatus of claim 1 further comprising an applicator housing mounted to said frame and carrying said light source; an adjusting mechanism connected to said housing or adjusting the same relative to the floor and including a third actuator for raising and lowering said housing relative to said frame; a sensor on said housing for generating a height signal representative of the distance of said housing above said floor, said computer receiving said height signal for determining whether said height signal is above a predetermined upper limit and for energizing third actuator to lower said housing when said height signal exceeds a predetermined height level, said computer being further programmed to energize said third actuator, to raise said housing when said height signal indicates that said housing is below a predetermined level, whereby said computer and third actuator maintain said housing within a predetermined range of height above said floor during operation.

10. The apparatus of claim 9 wherein said housing further includes a shutter comprising first and second sections, and a fourth actuator mounted in said housing for actuating said shutter sections between first and second positions, said shutter sections cooperating with said housing to enclose said light source in a first position and to focus light from said light source downwardly onto the floor in a second position, said fourth actuator being under control of said computer.

11. The apparatus of claim 10 further comprising a fan mounted in said housing for cooling said light source, said computer being programmed to energize said fan when said ballast circuit excites said lamp in the Run mode, said computer being further programmed to de-energize said fan when said ballast circuit is shut off or said ballast circuit excites said light source in a Startup mode.

12. A method of treating a photocurable coating applied to a surface comprising the steps of setting a predetermined power level for a source of curing light; sensing a motion control signal for moving said light source to traverse said coating; and moving said light source along said surface at a predetermined speed in response to said motion control signal; characterized in that said predetermined power level and said predetermined speed are selected to apply a substantially constant dose level of applied curing radiation to said coating.

13. The method of claim 12 further comprising operating said light source at a quiescent level of power less than said predetermined power level for curing said coating, prior to said step of sensing a motion control signal; and increasing the power level of said light source from said quiescent level to said predetermined power level upon sensing said motion control signal.

14. The method of claim 13 wherein said step of setting a predetermined power level includes selecting said predetermined power level from a plurality of power levels.

15. The method of claim 14 further comprising closing a shutter located between said light source and said coating; and opening said shutter immediately prior to moving said light source.

16. The method of claim 15 further comprising adjusting the height of said light source to be within a predetermined range above said surface.

17. Apparatus for curing a photocurable material applied to a floor surface, comprising a frame having wheels driven by a motor; controller controlling the speed of said motor; a source of curing light including a housing mounted to said frame for vertical motion; a sensor carried by said housing and generating signals representative of the height of said source above said floor surface; a ballast circuit selectively energizing said light source; a computer providing control signals to said ballast circuit to set the power level of said light source to a predetermined cure level; said computer sending signals to said controller to set the traverse speed of said apparatus at a rate determined in relation to the power level of said light source, said computer further receiving signals from said sensor and adjusting the height of said housing relative to said floor surface for curing.

18. The apparatus of claim 17 wherein said light source generates ultraviolet curing light and said computer is programmed to control said ballast circuit to set the power level of said light source to one of a plurality of predetermined levels corresponding to a cure level selected by an operator, said computer being further programmed to control the speed of said controller to a predetermined traverse speed for said apparatus determined by the associated cure level set by said operator.

19. The apparatus of claim 18 wherein said housing includes a shutter having a closed position in which said shutter blocks light from said light source to said floor surface, and an open position in which light from said source radiates onto said floor surface, and wherein said computer sets the power level of said light source and the traverse speed of said apparatus in response to a Cure mode defining a cure dosage set by said operator, said computer being responsive to a direction actuator under control of said operator to set the power of said light source upon actuation of said direction actuator by said operator and to set the traverse speed of said apparatus and thereupon to open said shutter and cause said apparatus to traverse the floor at said predetermined speed set by said computer.

20. The apparatus of claim 19 wherein said light source is a UV lamp and said apparatus further includes a Standby mode switch selectable by the operator, said computer being responsive to the actuation of said Standby mode switch by the operator to energize said ballast circuit to a Run mode in which said light source is operating at a power level sufficient to stabilize said light source, said ballast circuit thereafter reducing the power supplied to said light source to a quiescent state less than full power and sufficient to maintain said light source in a state of readiness, thereby reducing substantially the warm-up time for said light source for curing operation.

21. In combination, a powered floor machine for curing a photocurable material applied to a floor surface having a wheeled frame, a drive motor driving said wheels, a first source of curing light carried by said frame and a control circuit for setting the power to said light source and the speed of said motor, said control circuit adapted to connect to a source of electrical power; a portable hand-held applicator having an electrical cord adapted for connection to a source of electrical power, a second source of curing light, and a handle for manually manipulating said second source of UV light; and an electrical interlock switch connected in circuit with said controller circuit of said floor machine and said electrical cord of said hand-held applicator such that only one of said first and second sources of curing light is connected to said source of electrical power at any time.

* * * * *